United States Patent [19]

Stutzenberger

[11] Patent Number: 4,982,708
[45] Date of Patent: Jan. 8, 1991

[54] FUEL INJECTION NOZZLE FOR INTERNAL COMBUSTION ENGINES

[75] Inventor: Heinz Stutzenberger, Vaihingen/Enz, Fed. Rep. of Germany

[73] Assignee: Robert Bosch GmbH, Stuttgart, Fed. Rep. of Germany

[21] Appl. No.: 478,319

[22] Filed: Feb. 12, 1990

[30] Foreign Application Priority Data

Jun. 22, 1989 [DE] Fed. Rep. of Germany ....... 3920425

[51] Int. Cl.5 ...................... F02M 61/08; F02M 57/06
[52] U.S. Cl. .................................... 123/297; 123/298; 239/453; 239/456; 239/533.12
[58] Field of Search ................... 123/297, 298, 169 V; 313/120; 239/533.3–533.12, 453, 456

[56] References Cited

U.S. PATENT DOCUMENTS

| | | | |
|---|---|---|---|
| 2,186,216 | 1/1940 | Smith | 239/453 X |
| 2,555,803 | 6/1951 | Mashinter et al. | 239/533.12 X |
| 3,008,653 | 11/1961 | Morris et al. | 239/533.12 X |
| 4,095,580 | 6/1978 | Murray et al. | 123/297 |
| 4,736,718 | 4/1988 | Linder | 123/297 X |

Primary Examiner—Tony M. Argenbright
Attorney, Agent, or Firm—Edwin E. Greigg

[57] ABSTRACT

A fuel injection nozzle that produces a non-symmetrical conical stream in an eccentrically and obliquely installed fuel injection nozzle for a engine. The fuel injection nozzle body is formed with a conical end in which the center axis of the conical wall face forming the valve seat on the nozzle body is disposed at an angle (a) to the axis of the valve needle, and that a sealing face on the closing head of the valve needle that cooperates with the valve seat on the nozzle body is spherically curved.

6 Claims, 2 Drawing Sheets

FUEL INJECTION NOZZLE FOR INTERNAL COMBUSTION ENGINES

CROSS-REFERENCE TO RELATED APPLICATION

This application is related to application Ser. No. 236,710 filed Aug. 26, 1988, now U.S. Pat. No. 4,967,708.

BACKGROUND OF THE INVENTION

This invention is based on a fuel injection nozzle as defined in the above identified patent application. In the above set forth injection nozzle, a wall face forming a valve seat is disposed on the nozzle body symmetrically to the longitudinal axis of the bore receiving the valve needle, or to the longitudinal axis of the valve needle itself, so that in each case the injected fuel reaches the combustion chamber in the form of a radially symmetrically propagated conical stream. When the installation position is eccentric and oblique, however, as is virtually compulsory in two-valve engines, the use of such injection nozzles lead to unequal exposed lengths of the streams and thus results in a coating of fuel on the piston depression. Particularly, when the injection nozzles are used in internal combustion engines with externally supplied ignition and direct injection into the combustion chamber, this can produce unsatisfactory results.

OBJECT AND SUMMARY OF THE INVENTION

The arrangement according to the invention has an advantage that the conical fuel streams that form in the various three-dimensional directions have a different fuel stream length or fuel stream intensity; this adapts the fuel stream pattern better to the contour of the piston depression and makes for more favorable distribution of the fuel in the air in the combustion chamber.

The invention will be better understood and further objects and advantages thereof will become more apparent from the ensuing detailed description of a preferred embodiment taken in conjunction with the drawings.

DESCRIPTION OF THE EXEMPLARY EMBODIMENT

Figure 1:
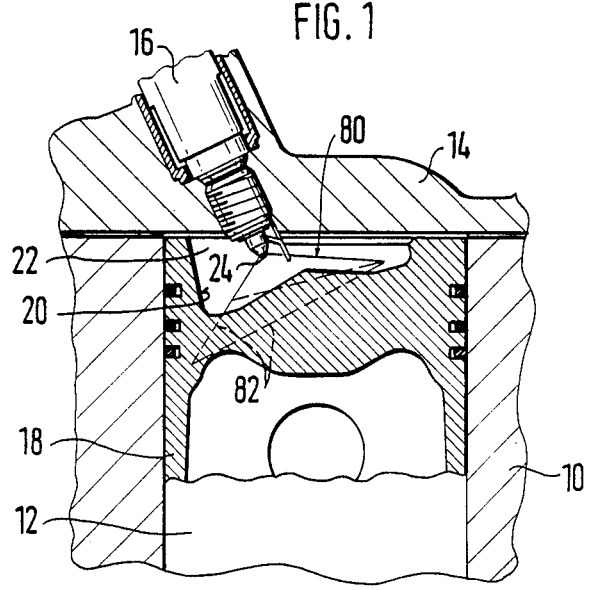
FIG. 1 is a fragmentary section through the cylinder head and a cylinder, with a piston, of an Otto engine with direct injection.

An engine block 10 includes a plurality of cylinders 12, which are covered by a cylinder head 14, each of which is assigned one injection nozzle 16, secured in the cylinder head 14. One piston 18 is movable in each cylinder 12, and is provided on its top with a piston depression 20 that toward the bottom defines a combustion chamber 22. The arrangement is such that in the top dead center position shown of the piston 18, the end 24 of the injection nozzle 1 toward the injection is located approximately in the middle of the combustion chamber 22, the volume of which, in this piston position, is defined substantially only by the shape of the piston depression 20.

The injection nozzle 16 has a retaining body 26, which is provided on its fuel injection end with an external thread 28 with which it is threaded into the cylinder head 14. A ceramic insulating body 30 is inserted into the retaining body 26 and protrudes past the end of the retaining body 26 that is nearer the injection end and is axially fixed in the retaining body by a tension nut 32. A retaining tube 34 is centrally secured in the insulating body 30 and toward the combustion chamber, the retaining tube protrudes into a recess 36 of increased inner diameter of the insulating body 30, and the retaining tube is coaxially connected to a nozzle body 38, which in turn, toward the combustion chamber, protrudes some distance past the face end of the insulating body 30.

Figure 3:
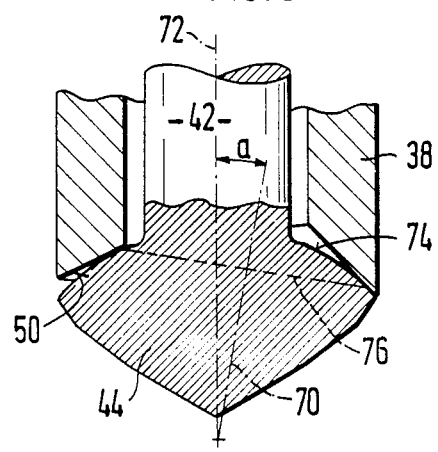
FIG. 3, on a still larger scale, shows the region of the valve of the injection nozzle of FIG. 2.
Figure 2:
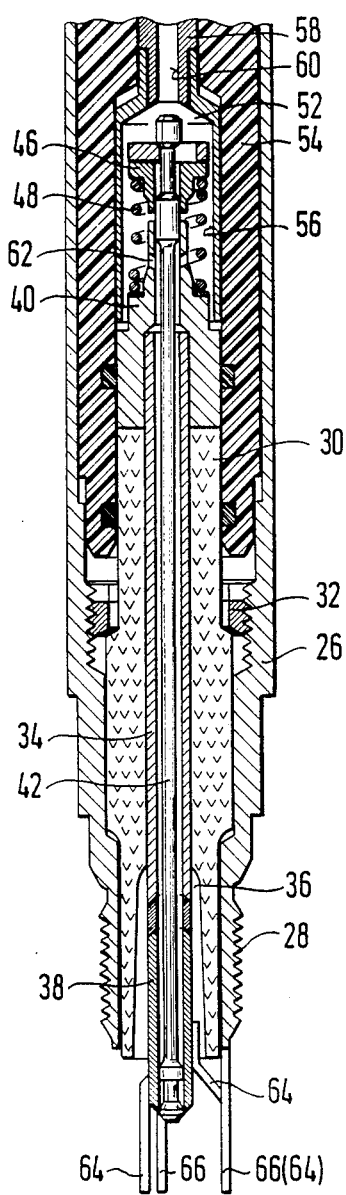
FIG. 2, on a larger scale, shows a fragmentary longitudinal section through the injection nozzle used in the arrangement of FIG. 1.

The retaining tube 34 extends at the upper end past the insulating body 30 and protrudes centeringly into a metal guide bushing 40 slipped onto the insulating body 30; the retaining tube 34 is firmly joined to the guide bushing 40 any suitable means such as by soldering. The extended shaft of a valve needle 42 is guided in the guide bushing 40, and toward the combustion chamber the valve needle protrudes past the nozzle body 38 and has a closing head 44, which is pressed against a conical wall face 50 (see FIG. 3) on the nozzle body 38, under the influence of a closing spring 48 that is supported on the guide bushing 40 and which engages the valve needle 42 via a spring plate 46. The embodiment of the closing head 44 and the disposition of the wall face 50 are described in further detail below, following the description of the overall structure of the injection nozzle.

The closing spring 48 and the spring plate 46 are disposed in a spring chamber 52, which is surrounded by an insulating bushing 54 of electrically nonconductive material, which sealingly surrounds the guide bushing 40 and the upper portion of the insulating body 30. The insulating bushing 54 is inserted into the retaining body 26 and is lined on the inside with a metal sleeve 56 rests on the guide bushing 40 in a contact-making manner; the metal sleeve 56 is connected to a tubular body 58 that centrally penetrates the insulating bushing 54. The tubular body 58 includes a fuel bore 60, which leads from a connection fitting of the injection nozzle, not shown, into the spring chamber 52, which communicates via a transverse bores 62 in the guide bushing 40 with the annular chamber between the valve needle 42 and the parts 40, 34, 38 surrounding it.

Three pin-like ignition electrodes 64 are secured to the fuel injection end of the nozzle body 38, distributed uniformly over its circumference, and one pin-like counterelectrode 66 is secured to the fuel injection end of the retaining body 26 and assigned one each to each ignition electrode, and spaced slightly apart from and parallel to it the ignition electrode. The ignition electrodes 64 communicate electrically conductively via the nozzle body 38, the retaining tube 34, the guide bushing 40 and the metal sleeve 56, with the tubular body 58, which is provided, at a location protruding from the cylinder 14 but no longer visible in the drawing, with an external electrical connection for an ignition generator. The counterelectrodes 66 are connected to ground via the retaining body 26 and the cylinder head 14.

The conical wall face 50 on the nozzle body 38 (FIG. 3) has a center axis 70, which forms an angle a with the axis of symmetry 72 of the injection nozzle 16; this angle may for example be on the order of magnitude of 3°. A spherically curved sealing face 74 is formed on the closing head 44 of the valve needle 42 and rests on the wall face 50 along an annular edge 76 that forms the valve seat attached to the housing. The annular edge 76, over its circumference, continuously varies its radial distance from the axis of symmetry 72 of the injection nozzle 16, so that as intended by the invention, when the valve needle 42 is lifted, a conical stream is produced that has different stream lengths or different stream intensity in the various three-dimensional directions.

The advantageous effect of this asymmetrical fuel distribution is shown in FIG. 1. With the arrangement shown there, the injection nozzle 16 is installed obliquely, as required for two-valve motors, in such a way that over one conical stream 80, unequally long free stream lengths are produced between the end 24 of the injection nozzle 16 and the line of intersection of the conical stream 80 with the piston depression 20. If the conical wall face 50 on the nozzle body 38 were disposed symmetrically with respect to the axis of symmetry 72 of the injection nozzle 16, the result would be fuel distribution as symbolically represented by the dashed lines 82, and would produce an undesirable coating of fuel over a portion of the piston depression 20.

By comparison, a fuel distribution that is different in the various three-dimensional directions is obtained with the arrangement according to the invention, as indicated by the region of the conical stream 80 shown in solid lines. By correspondingly selecting the position of the injection nozzle 16, a favorable distribution of the fuel into the air into the combustion chamber can be attained.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection nozzle for internal combustion engines, having a valve needle, a nozzle body (38) having an injection end, said nozzle body is provided with a central bore that receives and guides said valve needle, said central bore merges on a nozzle body face end toward the injection end with a wall face (50) that expands conically outward to form a valve seat (76), said valve needle including a closing head which closes against said wall face end, said closing head is pressed against the valve seat by a closing spring counter to a flow direction of an injection fuel delivered through said central bore, said conical wall face (50) forming the valve seat (76) is disposed on the nozzle body (38) on a center axis which is at an angle (a) to the longitudinal axis (72) of the valve needle (42) and said closing head (44) of the valve needle (42) includes a spherically curved sealing face (74) that cooperates with the valve seat (76) on the nozzle body (38) to form an emerging conical fuel injection stream (80).

2. An injection nozzle as defined by claim 1, in which at least one pair of electrodes (64, 66) is provided on the injection end of the fuel injection nozzle in a vicinity of the conical stream (80) of the emerging injection fuel which forms a spark gap of an ignition device for an internal combustion engine with externally supplied ignition.

3. An injection nozzle as defined by claim 2, in which said fuel injection nozzle includes a retaining body, by way of which said nozzle body is secured on said retaining body which can be connected to the cylinder head of the engine, and one electrode (66) of the spark gap is secured to the retaining body (26) and another electrode (64) is secured to the nozzle body (38), which is connected to the retaining body (26) via an insulating body (30).

4. An injection nozzle as defined by claim 2, in which at least one pair of electrodes (64, 66) is disposed in a circumferential region of the conical stream (80) in which, with externally supplied ignition, a most favorable fuel-to-air ratio prevails over a wide operating range.

5. An injection nozzle as defined by claim 3, in which at least one pair of electrodes (64, 66) is disposed in a circumferential region of the conical stream (80) in which, with externally supplied ignition, a most favorable fuel-to-air ratio prevails over a wide operating range.

6. A fuel injection nozzle as set forth in claim 1 in which said longitudinal axis of said valve nozzle is coaxial with said central bore.

* * * * *